United States Patent [19]

Kobayashi

[11] Patent Number: 4,895,232
[45] Date of Patent: Jan. 23, 1990

[54] TORQUE CONVERTER FOR AN AUTOMATIC TRANSMISSION

[75] Inventor: Toshio Kobayashi, Tokyo, Japan

[73] Assignee: Fuji Jukogyo Kabushiki Kaisha, Tokyo, Japan

[21] Appl. No.: 315,230

[22] Filed: Feb. 21, 1989

Related U.S. Application Data

[63] Continuation of Ser. No. 159,632, Feb. 23, 1988, abandoned.

[30] Foreign Application Priority Data

Mar. 18, 1987 [JP] Japan .................. 62-064776

[51] Int. Cl.$^4$ .............................................. F16H 45/02
[52] U.S. Cl. .................... 192/3.3; 192/3.28; 192/110 R; 192/110 B
[58] Field of Search .............. 192/3.28, 3.29, 3.3, 192/3.31, 110 R, 110 B

[56] References Cited

U.S. PATENT DOCUMENTS

| | | | |
|---|---|---|---|
| 3,706,240 | 12/1972 | Bonneman et al. | 74/869 |
| 3,782,186 | 1/1974 | Bunch et al. | 73/136 R |
| 4,014,223 | 3/1977 | Pierce, Jr. | 74/688 |
| 4,353,444 | 10/1982 | Bionaz | 192/3.29 |
| 4,406,355 | 9/1983 | Bionaz | 192/3.3 |
| 4,431,094 | 2/1984 | Parthuisot et al. | 192/3.3 |
| 4,576,260 | 3/1986 | Koshimo | 192/3.31 |

FOREIGN PATENT DOCUMENTS

| | | | |
|---|---|---|---|
| 57-51056 | 3/1982 | Japan . | |
| 58-128559 | 8/1983 | Japan | 192/3.29 |
| 59-163260 | 11/1984 | Japan . | |

Primary Examiner—Leslie A. Braun
Assistant Examiner—David A. Testardi
Attorney, Agent, or Firm—Martin A. Farber

[57] ABSTRACT

A torque converter has a converter cover secured to a crankshaft of an engine, an input shaft, a turbine secured to the input shaft, and a lockup clutch including a lockup piston. A pilot boss having an axial hollow therein is secured to the converter cover. An outer end of the pilot boss is engaged with a hole formed in the crankshaft, and an inner end of the pilot boss is rotatably mounted in a hub of the turbine, thereby rotatably supporting the turbine. An oil passage is formed in the input shaft and the pilot boss, for supplying release oil to a release side chamber formed between the converter cover and the lockup piston so as to disengage the lockup piston from the converter cover.

8 Claims, 2 Drawing Sheets

TORQUE CONVERTER FOR AN AUTOMATIC TRANSMISSION

RELATED APPLICATION

This application is a continuation of my co-pending application Ser. No. 07/159,632 filed Feb. 23, 1988, now abandoned.

BACKGROUND OF THE INVENTION

The present invention relates to a lockup clutch of a torque converter for a motor vehicle, and more particularly to a structure for mounting the lockup clutch.

A lockup clutch of a torque converter is generally disposed in a converter cover between the cover and a turbine. The lockup clutch having a lockup piston integral with a torsion damper is slidably mounted on a turbine hub of the turbine. The lockup clutch is brought into lockup state or release state by controlling oil pressures applied to oil chambers on opposite sides of the piston so as to engage and disengage the piston with the converter cover.

Japanese patent application laid open No. 57-51056 and Japanese utility model application laid open No. 59-163260 disclose structures for mounting such a lockup clutch. A hub of the turbine is slidably splined to an input shaft at the front end thereof in the same manner as the torque converter without the lockup clutch. The turbine hub supports the lockup piston and the torsion damper as well as the turbine.

However, the input shaft is supported at a rear end but not at the front end where the turbine hub is mounted. Thus, the weight of the lockup clutch on the front end of the input shaft in addition to the weight of the turbine and unbalanced load of the lockup clutch turbine cause the shaft to oscillate when the lockup piston is not in contact with the converter cover. The oscillation is transmitted to a stator shaft surrounding the input shaft. The stator shaft is subjected to bending stress in addition to torque from the stator of the torque converter. Thus, stress at a supporting portion of the stator shaft becomes large.

The stator shaft is usually made of cast iron since it is generally formed integral with a cover of an oil pump and has oil passage therein and ports for the oil passages. Accordingly, the stator shaft tends to break at the base due to the above-described stress. In addition, in a transaxle type transmission system having a differential device in a space between the torque converter and an automatic transmission, the stator shaft becomes longer, resulting in significant damage, in accordance with the stress.

In another mounting structure, the front end of the input shaft is axially slidably supported by the converter cover through a bearing for the convenience of assembly of the converter. In such a torque converter, radial passages to a release side oil chamber are formed in the input shaft. While the lockup clutch is locked, oil is not supplied to the release side chamber, thereby urging the lockup piston to the converter cover. Therefore, oil passages in the input shaft communicated with the release side chamber are thus obstructed by the bearing.

Accordingly, when release oil is supplied to the chamber passing through the passages, the oil flow is reduced by the passages. As a result, the release of the lockup clutch is delayed, and causes a shock when changing the transmission ratio.

SUMMARY OF THE INVENTION

An object of the present invention is to provide a mounting structure of a lockup clutch which prevents oscillation thereof.

According to the present invention, there is provided a torque converter for a motor vehicle driven by an engine, the torque converter having a converter cover secured to a crankshaft of the engine, an impeller secured to the converter cover, an input shaft for an automatic transmission, a turbine secured to the input shaft at a turbine hub, and a lockup clutch including a lockup piston axially slidably mounted on the turbine hub.

The torque converter comprises a pilot boss having an axial hollow therein and secured to the converter cover at a center thereof, an outer end of the pilot boss being engaged with a hole formed in the crankshaft at the axis thereof, and an inner end of the pilot boss being rotatably mounted in the turbine hub to rotatably support the turbine, an oil passage formed in the input shaft and the pilot boss, for supplying release oil to a release side chamber formed between the converter cover and the lockup piston so as to disengage the lockup piston from the converter cover, and the turbine hub has an annular inner boss and an annular outer boss, the pilot boss is rotatably mounted in the inner boss and the lockup clutch further comprises a torsion damper which comprises a drive plate secured to the lockup piston and a driven plate between the drive plate and the lockup piston, and the lockup piston and the driven plate are axially slidably mounted on the inner and outer bosses, respectively.

These and other objects and features of this invention will understood from the following description with reference to the accompanying drawings.

DETAILED DESCRIPTION OF THE PREFERRED EMBODIMENT

Figure 1:
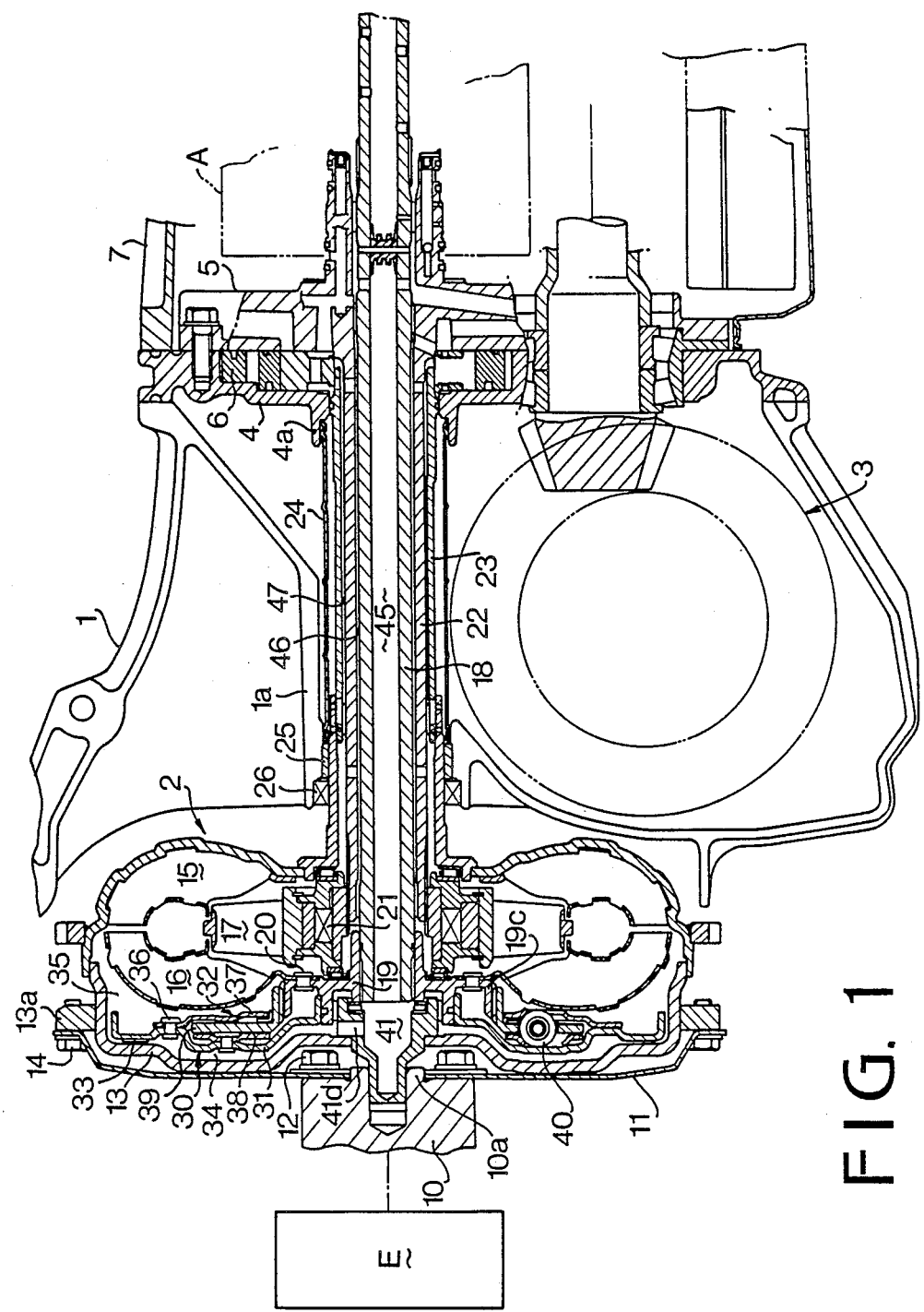
FIG. 1 shows a sectional view of an automatic transmission system of the present invention.

FIG. 1 shows a power transmission system for a motor vehicle having a longitudinally mounted engine E at a front portion thereof. The power transmission system has a differential case 1, a torque converter 2 with a lockup clutch 30, and a differential 3 behind the torque converter 2. An oil pump 6 is housed in a pump housing 4 and a cover 5 at the rear end of the differential case 1. A transmission case 7 housing an automatic transmission A is attached to the rear of the pump housing 4.

A crankshaft 10 of the engine E has a boss 10a to which a drive plate 11 is fixed by bolts 12. A converter cover 13 is secured to the drive plate 11 by bolts 14 at a flange 13a. The torque converter 2 comprises an impeller 15 integral with the converter cover 13 by welding, a turbine 16 and a stator 17 connected to a hollow stator shaft 22 through a one-way clutch 21. The turbine 16 is fixed by rivets 20 to a disc 19c of a turbine hub 19, the sleeve portion of which is splined to an input shaft 18 disposed in the stator shaft 22. The input shaft 18 extends into the transmission case 7. The stator shaft 22 is integral with the cover 5 of the oil pump 6. A pump drive shaft 23 surrounding the stator shaft 22 is connected to the impeller 15 and is operatively connected with a rotor of the oil pump 6. In order to prevent leakage of automatic transmission fluid and mixing of the fluid with oil for differential gears, a seal pipe 24 for covering the pump drive shaft 23 is further provided. The front end portion of the seal pipe 24 is tightly embedded in a cylindrical portion 1a of the differential case 1 through a bush 25 and sealed by an oil seal 26 to prevent the oil from leaking. The rear end is tightly embedded in a boss 4a of the pump housing 4.

A lockup clutch 30 of the torque converter 2 has a lockup piston 31 and a torsion damper 32. The lockup piston 31 is disposed adjacent the converter cover 13, thereby defining a release side oil chamber 34 for applying release pressure to the lockup piston 31. Near the periphery of the lockup piston 31, a facing 33 is attached for making contact with the cover 13. The torsion damper 32 comprises a drive plate 37 securely attached to an outer portion of the lockup piston 31 by rivets 36, a side plate 38 attached to the lockup piston 31 at an inner portion and a driven plate 39 interposed therebetween. A plurality of torsion springs 40 are annually disposed between the plates 37 and 39 to absorb shock when the lockup clutch 30 is locked. Behind the drive plate 37, an apply side oil chamber 35 for applying lockup pressure to the lockup piston 31 is formed.

Figure 2:
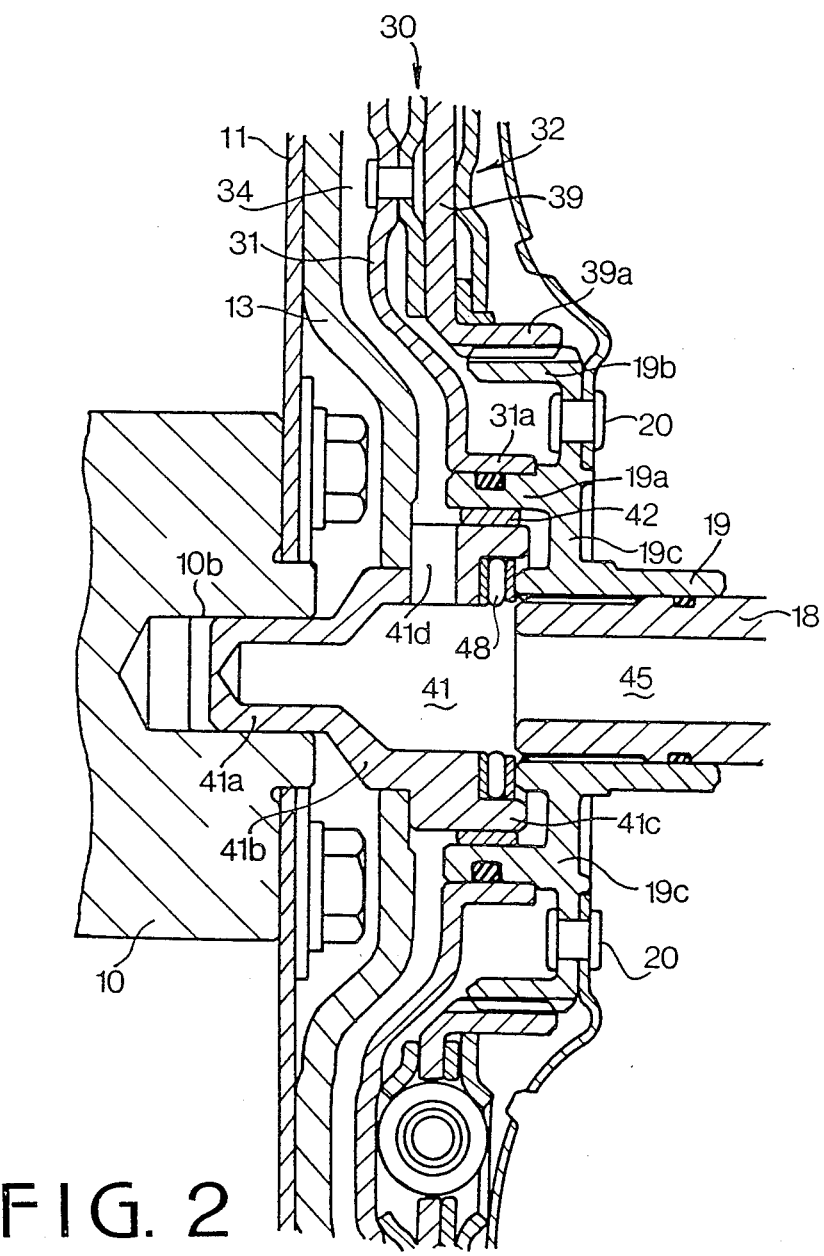
FIG. 2 is an enlarged sectional view of a main part of FIG. 1.

Referring to FIG. 2 showing a mounting structure of the lockup clutch 30 in detail, a hollow pilot boss 41 is disposed between the crankshaft 10 and the input shaft 18 for guiding the input shaft. The pilot boss 41 has a small diameter portion 41a, intermediate portion 41b and large diameter portion 41c. The small diameter portion 41a projects out of the converter cover 13 and is engaged with hole 10b formed in the center of the crankshaft 10. The intermediate portion 41b is engaged with the converter cover 13 and is secured thereto, so that the converter cover 13 is arranged coaxial with the crankshaft 10. The large diameter portion 41c has a valveless radial bore 41d for supplying oil in the release side chamber 34.

The turbine hub 19 has an annular inner boss 19a and an annular outer boss 19b extending to the lockup clutch from the disc 19c of the turbine hub 19. The large diameter portion 41c of the pilot boss 41 is mounted in the inner boss 19a, interposing a bush 42 so that the turbine 16 is rotatably supported on the pilot boss 41. Slidably mounted on the inner boss 19a is a hub 31a of the lockup piston 31. A hub 39a of the driven plate 39 engages with the outer boss 19b through splines. Accordingly, the axes of the crankshaft 10 and the converter cover 13 are in alignment with the input shaft 18. An axial thrust bearing 48 is inserted in an annular stepped recess formed in the large diameter portion 41c of the pilot boss 41. The radially outside periphery of the bearing 48 is fitted in the recess but the radially inside periphery of the bearing 48 is free. Opposite sides of the bearing 48 abut the recess and an axially outer end of the sleeve portion of the turbine hub 19.

As shown in FIG. 1, a hydraulic circuit for the torque converter 2 comprises an oil passage 45 formed in the input shaft 18 for the release of the lockup clutch 30. The passage 45 is communicated with the release side oil chamber 34 through the hollow of the pilot boss 41 and the valveless radial bore 41d formed therein. An oil passage 46 formed between the input shaft 18 and the stator shaft 22 is communicated with oil pump 6 and the apply side oil chamber 35. A drain passage 47 for draining the oil in the torque converter is formed between the stator shaft 22 and the pump drive shaft 23. The pressure of oil in the release side chamber 34 is set to a value slightly higher than that of the apply side chamber 35 to disengage the lockup piston 31 from converter cover 13.

The operation of the lockup clutch 30 is described hereinafter. The power of the engine E is transmitted to the impeller 15 of the torque converter 2 through the crankshaft 10, drive plate 11 and the converter cover 13. The power is transmitted to the oil pump 6 through the pump drive shaft 23 to drive it to supply oil to the torque converter 2 through the passage 46. The oil in the turbine 16 is further supplied to the apply side chamber 35 to urge the lockup piston 31 toward the converter cover 13.

When the vehicle is driven at a speed lower than a predetermined speed, or at the changing of the transmission ratio in the automatic transmission, release oil pressure slightly higher than that in the apply side chamber 35 is applied to the release side oil chamber 34 through the passage 45 and the hollow of the pilot boss 41. Accordingly, the lockup piston 31 is urged by the difference of the oil pressures in the chambers 34 and 35 to disengage the lockup clutch from the converter cover 13. Thus, the torque converter 2 operates to transmit the power of the engine to the automatic transmission through the turbine 16, turbine hub 19 and input shaft 18.

When the speed of the vehicle becomes higher than the predetermined speed in steady driving states, the oil in the release side chamber 34 is drained through the passage 45 so that the lockup piston 31 is pushed by the oil pressure in the apply side chamber 35. Thus, the facing 33 of the lockup piston 31 comes in contact with the converter cover 13 to lock the crankshaft 10 and the lockup piston 31. Accordingly, the engine power is transmitted to the input shaft 18 through the converter cover 13, lockup piston 31, torsion damper 32 and turbine hub 19. During such an operation, the turbine 16 and the impeller 15 are rotated at the same speed, which means locking of the torque converter 2.

Therefore, by controlling the supply of oil to the release side oil chamber 34 without using any valve, the engine power can be transmitted to the input shaft 18 either through the torque converter 2 or through the lockup clutch 30.

When the lockup clutch 30 is released, the lockup piston 31 and the torsion damper 32 are idly rotated by the rotation of the turbine hub 19. The turbine hub 19 bearing the piston 31 and the torsion damper 32 is supported by the pilot boss 41 through the bush so as to securely hold the piston 31 and the damper 32 in alignment with the turbine hub 19. Thus, the turbine hub 19 and the input shaft 18 are safeguarded from oscillation so that excessive bending stress is not generated.

From the foregoing, it will be understood that the present invention provides a mounting structure for a lockup clutch of a torque converter wherein even a long input shaft, employed in a vehicle with a transaxle type transmission, is effectively prevented from oscillation. Accordingly, damage to a stator shaft is reduced so that the durability thereof increases.

While the presently preferred embodiment of the present invention has been shown and described, it is to be understood that this disclosured is for the purpose of illustration and that various changes and modifications may be made without departing from the spirit and scope of the invention as set forth in the appended claims.

What is claimed is:

1. A torque converter for a motor vehicle driven by an engine, the torque converter having a converter cover secured to a crankshaft of the engine, an impeller secured to the converter cover, an input shaft for an automatic transmission, a turbine secured to the input shaft at a turbine hub, and a lockup clutch including a lockup piston axially slidably mounted on the turbine hub and a torsion damper which comprises a drive plate secured to the lockup piston and a driven plate between the drive plate and the lockup piston, the turbine hub having a disc formed on a periphery of the turbine hub, a pilot boss having an axial hollow therein, and an annular inner boss and an annular outer boss extending from said disc in a direction toward the crankshaft, the improvement in the torque converter wherein:

said pilot boss has a small diameter portion, an intermediate diameter portion and a large diameter portion which are accurately concentric to each other and are inserted between said crankshaft and said input shaft;

an outer end of said small diameter portion of the pilot boss being engaged with a hole formed in the crankshaft at an axis thereof;

said intermediate diameter portion supports said converter cover;

said large diameter portion of the pilot boss rotatably supports said lockup piston interposing said annular inner boss so as to accurately coaxially align each axis of said crankshaft, of said converter cover and of said lockup piston;

said pilot boss being formed with a bore extending in a radial direction therein with respect to an axis of the torque converter and communicating with said axial hollow and a release side oil chamber formed between the converter cover and said lockup piston for supplying release oil to said release side oil chamber;

thrust bearing means being inserted in a recess formed in said pilot boss, said recess communicating with the axial hollow, for receiving an axial thrust force of said turbine hub;

the lockup piston being axially slidably mounted on said annular inner boss interposing sealing means for preventing oil from leaking out of said release side oil chamber;

the driven plate being coaxially slidably mounted on said annular outer boss via a spline therebetween; and an oil passage being formed in the input shaft communicating with said axial hollow of said pilot boss for supplying said release oil to said release side oil chamber via said bore so as to disengage the lockup piston from the converter cover.

2. The torque converter according to claim 1, further comprising
a bush disposed between said annular inner boss and said inner end of said pilot boss.

3. The torque converter according to claim 1, wherein
said driven plate has a hub rotatably splined to and axially slidably mounted on the annular outer boss.

4. The torque converter according to claim 3, wherein
said torsion damper includes a side plate secured to said lockup piston and disposed between said lockup piston and said driven plate, and a plurality of torsion springs annularly disposed between said drive and driven plates.

5. A torque converter according to claim 1, wherein
said bore is a valveless bore, and
said thrust bearing means is positioned axially adjacent a sleeve portion of said turbine hub.

6. A torque converter according to claim 5, wherein
said recess is a stepped annular recess in said large diameter portion of said pilot boss at an inner end thereof.

7. A torque converter for a motor vehicle driven by an engine, the torque converter having a converter cover secured to a crankshaft of the engine, an impeller secured to the converter cover, an input shaft for an automatic transmission, a turbine secured to the input shaft at a turbine hub, and a lockup clutch including a lockup piston axially slidably mounted on the turbine hub for releasable engagement with said converter cover, comprising:

a pilot boss having an axial hollow therein and a valveless bore extending exclusively radially of an axis of the torque converter communicating a release side chamber formed between the converter cover and the lockup piston with said axial hollow, said pilot boss supporting the converter cover;

an outer end of the pilot boss being engaged in a hole formed in the crankshaft at the axis thereof, and an inner end of the pilot boss being rotatably mounted in the turbine hub to rotatably support the turbine hub;

an oil passage formed in the input shaft communicating with the axial hollow of the pilot boss for supplying release oil via said bore to said release side chamber so as to disengage the lockup piston from the converter cover.

8. A torque converter for a motor vehicle driven by an engine, the torque converter having a converter cover secured to a crankshaft of the engine, an impeller secured to the converter cover, an input shaft for an automatic transmission, a turbine secured to the input shaft at a turbine hub, and a lockup clutch including a lockup piston axially slidably mounted on the turbine hub for releasable engagement with said converter cover, comprising:

a pilot boss having an axial hollow therein, said pilot boss supporting the converter cover;

an outer end of the pilot boss being engaged in a hole formed in the crankshaft at the axis thereof, and an inner end of the pilot boss being rotatably mounted in the turbine hub to rotatably support the turbine hub;

an axial thrust bearing positioned within a recess formed in the pilot boss and axially adjacent a sleeve portion of the turbine hub; and an oil passage formed in the input shaft and the pilot boss for supplying release oil to a release side chamber formed between the converter cover and the lockup piston so as to disengage the lockup piston from the converter cover.

* * * * *